United States Patent [19]

Penn et al.

[11] 4,456,268

[45] Jun. 26, 1984

[54] FASTENING MEANS IN SEALED GASKET ASSEMBLY INCLUDING SHOULDER BOLT

[75] Inventors: Steven M. Penn, Plano, Tex.; Jerome L. Berti, Chicago Heights; Robert F. Kovarik, Jr., Downers Grove, both of Ill.

[73] Assignee: Allis-Chalmers Corp., Milwaukee, Wis.

[21] Appl. No.: 430,007

[22] Filed: Sep. 30, 1982

[51] Int. Cl.³ .............................................. F16J 15/12
[52] U.S. Cl. ..................................... 277/106; 277/166; 277/180; 277/186
[58] Field of Search ............... 277/102, 106, 166, 180, 277/186, 188 R, 228, 188 A, 237

[56] References Cited

U.S. PATENT DOCUMENTS

| | | | |
|---|---|---|---|
| 1,980,335 | 11/1934 | Hewitt et al. | 277/180 |
| 2,790,660 | 4/1957 | Jones | 277/180 |
| 3,519,279 | 7/1970 | Wagner | 277/166 |
| 3,541,917 | 11/1970 | Van Douwen et al. | 277/166 X |
| 3,787,060 | 1/1974 | Astill | 277/106 X |
| 4,118,041 | 10/1978 | Futamura | 277/180 |
| 4,201,309 | 5/1980 | Bauer | 277/180 X |
| 4,232,496 | 11/1980 | Warkentin | 277/180 X |

FOREIGN PATENT DOCUMENTS

| | | | |
|---|---|---|---|
| 272717 | 10/1963 | Australia | 277/180 |
| 653740 | 12/1962 | Canada | 277/180 |
| 849343 | 8/1939 | France | 277/180 |
| 1227402 | 3/1960 | France | 277/180 |
| 883464 | 11/1961 | United Kingdom | 277/180 |
| 967538 | 8/1964 | United Kingdom | 277/180 |

*Primary Examiner*—Robert S. Ward
*Attorney, Agent, or Firm*—Arthur L. Nelson

[57] ABSTRACT

A means maintaining compressive force in a seal assembly to assure seal reliability. The valve cover is fastened to the engine head with a shoulder bolt which carries Belleville washers compressively positioned between the bolt head and valve cover. The gasket load and deflection is determined by the compressive force or gasket loading of the Belleville washers on the unthreaded length of the shoulder bolt. The resilience of the Belleville washers maintains a continuous force on the gasket for the life of the sealed assembly.

10 Claims, 8 Drawing Figures

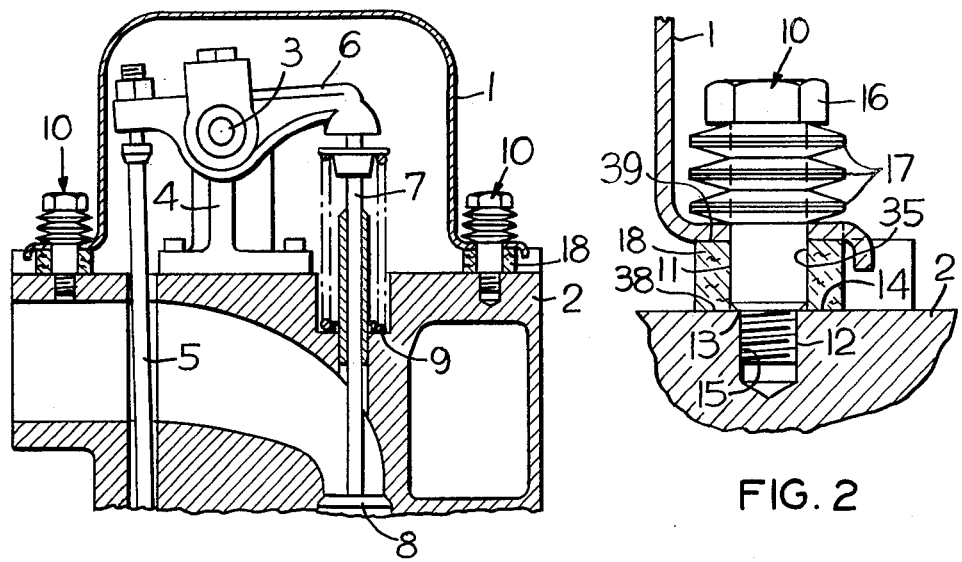
FIG. 1
FIG. 2
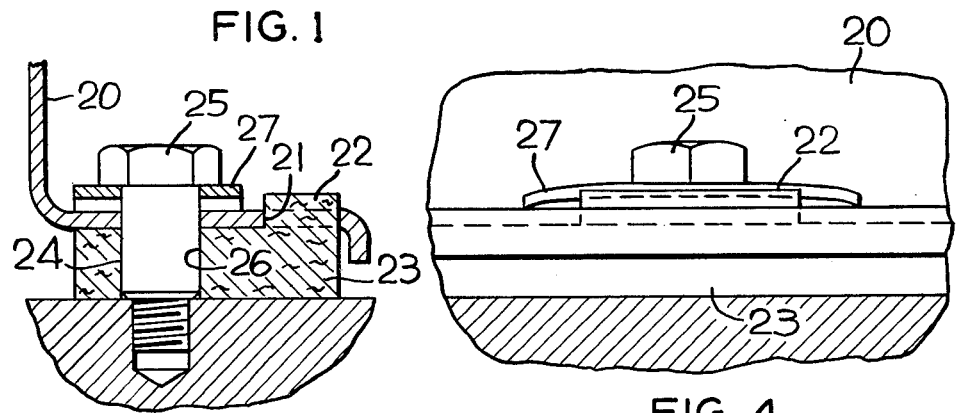
FIG. 3
FIG. 4
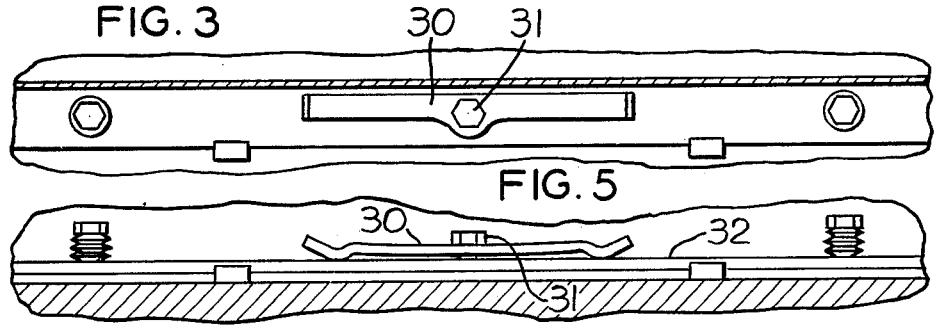
FIG. 5
FIG. 6
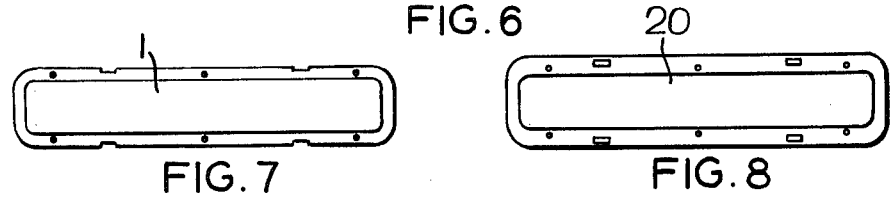
FIG. 7
FIG. 8

FASTENING MEANS IN SEALED GASKET ASSEMBLY INCLUDING SHOULDER BOLT

This invention relates to a seal assembly and, more particularly, to a resilient compression retaining means to maintain a continuous force on the seal assembly to assure seal reliability.

Conventional practice for fastening valve covers and oil pans on an internal combustion engine use a fully threaded cap screw for fastening the pan to the engine block or the cover to the engine head with a seal intermediate the two components to provide a fluid-tight seal assembly. A measured torque is sequentially applied to the cap screws during fastening of the gasket and cover to provide a uniform gasket loading and deflection. Even though a uniform torque is, in theory, applied to each of the cap screws, the difference in the coefficient of friction among the cap screw mating surfaces, error of the torque measuring device, and human error in the use of the torque measuring device may cause variations in the gasket loading and uneven deflection of the gasket in the sealed assembly which usually reduces reliability of the sealed assembly and shortens the life of the gasket during normal operation. Accordingly, the applicant has provided for a fastening means with a more uniform compression applied to the gasket and retains a continuous force by resilient means, even though the gasket may have compressive set due to aging and lack of resilience over the life of the gasket.

Although U.S. Pat. No. 4,118,041, Kazumasa Futamura entitled "Seal Structure" shows a stud bolt with intermediate shoulder to limit the compressive force on the gasket, no provision is made for a continued force through resilient means for the life of the sealed assembly. Accordingly, the applicant has provided for a shoulder bolt with an unthreaded length and a spring carried on the bolt to provide a controlled compressive force to maintain a continuous force on the gasket for the life of the sealed assembly.

It is an object of this invention to provide a fastening means for a seal assembly to limit the compressive force and maintain a continuous force on the seal continuous for the life of the seal assembly.

It is another object of this invention to provide a fastening means in a sealed gasket assembly including a shoulder bolt carrying a resilient washer to provide compressive force of a predetermined value continuous for the life of the sealed assembly to maintain greater reliability.

The objects of this invention may be accomplished with the use of either a valve cover or an oil pan. The valve cover is fastened to the engine head with a shoulder bolt which carries Belleville washers compressively positioned between the bolt head and the valve cover. The gasket load and deflection is determined by the compressive force or gasket loading of the Belleville washers on the unthreaded length of the shoulder bolt. The resilience of the Belleville washers maintains a continuous force on the gasket for the life of the sealed assembly. The subassembly of the cover, the Belleville washers, and the gasket can be carried on the bolts to provide a subassembly to facilitate assembly on the engine.

Referring to the drawings, the preferred embodiment of this invention is illustrated:

FIG. 1 is a cross section view of the engine head and valve cover.

FIG. 2 illustrates an enlarged cross section view of the gasket seal assembly and fastening means.

FIG. 3 illustrates a cross section view of a modification of the invention using a leaf spring.

FIG. 4 is a partial section view of the right side of the modification shown in FIG. 3.

FIG. 5 is a fragmentary plan view of a modification of the invention.

FIG. 6 is a partial cross section and side view of FIG. 5 showing the modification.

FIG. 7 is a plan view of the valve cover showing gasket alignment means.

FIG. 8 is a modification of FIG. 7 showing a plan view of the valve cover with modified gasket aligning means.

Referring to the drawings, FIG. 1 shows a cross section view of the valve cover 1 on the engine head 2. The rocker arm shaft 3 is pivotally supported on the mounting bracket 4. Push rod 5 operates the rocker arm 6 engaging the valve stem 7 of the valve 8. The spring 9 returns the valve to a normally closed position. A plurality of bolts 10 fasten the valve cover 1 and the gasket 18 in the normally sealed position.

FIG. 2 illustrates an enlarged view of the valve cover 1 on the engine head 2. The shoulder bolt 10 is provided with a cylindrical portion 11 and a threaded portion 12. The shoulder 13 engages the surface 14 in its fastened position. A threaded opening 15 receives the threaded portion of the bolt 10.

A valve cover 1 is shown for the purposes of illustration. It is understood, however, that an oil pan instead of a valve cover 1 might also adapt itself to the use of this sealing arrangement. An oil pan, however, would be in an inverted position from that shown in FIG. 2.

The head 16 of the bolt 10 compressively engages the top of a plurality of Belleville washers 17 which are compressively positioned between the head 16 and the valve cover 1. The gasket 18 is compressively positioned between the valve cover 1 and the facing 14 of the engine head 2.

FIGS. 3 and 4 illustrate a modification of the invention. The valve cover 20 is provided with an opening 21 to receive a protrusion 22 on the gasket 23. This provides an alignment portion of the gasket. The cylindrical portion 24 of the shoulder bolt 25 may be constructed in such a manner that it forms an interference fit with the opening 26 in the gasket 23. In this manner, the shoulder bolt 25 is inserted through an opening in the leaf spring 27 and extends through the gasket 23 and because of the interference fit of the plurality of bolts 25, the gasket 23, the spring 27 and the valve cover 20 are retained in a subassembly which can be readily assembled on the engine.

FIG. 4 shows a side view of the modification shown in FIG. 3 in which the leaf spring 27 is biased to resiliently hold down the valve cover 20 and produce a compressive force on the gasket 23.

FIGS. 5 and 6 also show a modification of the invention. A leaf spring 30 is mounted under the shoulder bolt 31 in the assembled position, the leaf spring is deformed to produce a compressive force on the two ends of the leaf spring to bias the valve cover to compressively seat the gasket 32 in a sealed position. The shoulder bolt 31, as shown in FIGS. 5 and 6, is essentially the same as the shoulder bolt 25 shown in FIGS. 3 and 4. A bolt and sleeve may also be used where the sleeve governs the assembled cylinderical height of 24 and the precompression of the spring.

The valve cover illustrated in FIGS. 3 and 4 is shown in plan view in FIG. 8. The valve cover shown in FIGS. 5 and 6 is shown in plan view of FIG. 7.

The operation of the device will be described in the following paragraphs:

Referring to FIGS. 1 and 2, the valve cover 1 is positioned on the gasket 18. The shoulder bolt 10 is assembled with a plurality of Belleville washers 17 and is inserted through an opening 35 in the gasket 18. Preferably, the cylindrical portion 11 of the shoulder bolt 10 forms an interference fit with the gasket to maintain a subassembly of a plurality of shoulder bolts, Belleville washers, and valve cover together with the gasket. This subassembly can easily be assembled on the engine head. When this subassembly is assembled on the engine head 2, the shoulder bolts 10 are fastened to the engine head by screwing each bolt downwardly until the shoulder 13 firmly engages the surface 14 of the engine head. This locks the assembly in the operating position. The Belleville washers 17 are compressed when the shoulder 13 of the bolt 10 engages the surface 14 of the engine head 2. A compressive force of the Belleville washers 17 bias the valve cover 1 downwardly against the gasket 18 to partially deflect the gasket and form a fluid-tight interface 38 between the engine head 2 and the gasket 18 as well as the interface 39 between the valve cover 1 and the gasket 18. This provides a fluid-tight seal and because of the continued force applied by the Belleville washers 17 even though the gasket in time develops a compressive set, the compressive force of the Belleville washers will still produce a fluid-tight type seal assembly.

The embodiments of the invention in which an exclusive property or privilege is claimed are as follows:

1. A seal assembly comprising, a first sealed member defining a hole, a second sealed member defining a threaded opening, a seal element positioned between said first sealed member and said second sealed member forming a sealed interface between said seal and each of said members, a bolt defining a bolt head and a threaded portion with the threaded portion received in the threaded opening of said second sealed member, spacer means on said bolt extending from said bolt head to said second sealed member through said hole, resilient means on said bolt, said spacer means on said bolt extending through said hole in said first sealed member and with said resilient means to extend from the bolt head to said first sealed member for biasing said first sealed member to produce and continuously maintain a compressive force on said seal element and thereby continuously maintain seals at said interfaces.

2. A seal assembly as set forth in claim 1 wherein said resilient means defines a spring encircling the spacer means on said bolt.

3. A seal assembly as set forth in claim 1 wherein said resilient means defines Belleville washers under compression and encircling said bolt.

4. A seal assembly as set forth in claim 1 wherein said first sealed member defines a valve cover and said second sealed member defines an engine head.

5. A seal assembly as set forth in claim 1 wherein the spacer means on each of said bolts defines an interference fit with the seal element retaining said seal in the assembled position on said bolt.

6. A seal assembly as set forth in claim 1 wherein said first sealed member defines alignment slots, said seal defines alignment protrusions for reception in said slots to align said seal element with said first sealed member.

7. A seal assembly as set forth in claim 1 wherein said first sealed member defines a valve cover, said resilient means defines a plurality of Belleville washers.

8. A seal assembly as set forth in claim 1 wherein said bolt and spacer means defines a shoulder bolt.

9. A seal assembly as set forth in claim 1 wherein said bolt and spacer means defines a bolt received in a sleeve.

10. A seal assembly as set forth in claim 1 wherein said bolt defines a head, a plurality of Belleville washers positioned between said bolt head and said first sealed member to compressively bias said first sealed member partially deflect said seal element to form a fluid-tight seal.

* * * * *